United States Patent
Husak et al.

(10) Patent No.: US 8,583,154 B2
(45) Date of Patent: Nov. 12, 2013

(54) ENERGY AND TIME-EFFICIENT SET-UP OF A WIRELESS COMMUNICATION SYSTEM

(75) Inventors: Jan Husak, Prague (CZ); Frank Lahner, Erlangen (DE); Peter Thamm, Weinheim (DE)

(73) Assignee: Siemens Aktiengesellschaft, Munich (DE)

( * ) Notice: Subject to any disclaimer, the term of this patent is extended or adjusted under 35 U.S.C. 154(b) by 446 days.

(21) Appl. No.: 12/934,110

(22) PCT Filed: Mar. 25, 2008

(86) PCT No.: PCT/EP2008/002346
§ 371 (c)(1),
(2), (4) Date: Dec. 20, 2010

(87) PCT Pub. No.: WO2009/118022
PCT Pub. Date: Oct. 1, 2009

(65) Prior Publication Data
US 2011/0136524 A1   Jun. 9, 2011

(51) Int. Cl.
*H04W 56/00* (2009.01)
*H04B 7/00* (2006.01)

(52) U.S. Cl.
USPC ...... 455/502; 455/343.1; 455/574; 455/67.11

(58) Field of Classification Search
USPC .............. 455/502, 507, 503, 450, 452.1, 509, 455/455, 67.11, 67.16, 343.1, 343.2, 574, 455/41.1, 41.2, 127.5; 370/311, 318
See application file for complete search history.

(56) References Cited

U.S. PATENT DOCUMENTS

| | | | |
|---|---|---|---|
| 5,778,075 A * | 7/1998 | Haartsen | 380/272 |
| 6,594,250 B1 * | 7/2003 | Silventoinen et al. | 370/347 |
| 2006/0009246 A1 | 1/2006 | Marinier et al. | |
| 2008/0165761 A1 | 7/2008 | Goppner et al. | |

FOREIGN PATENT DOCUMENTS

| | | |
|---|---|---|
| CN | 1360444 | 7/2002 |
| EP | 1 153 554 | 11/2001 |
| WO | WO 98/09458 | 3/1998 |
| WO | WO 98/21909 | 5/1998 |
| WO | WO 2006/056174 | 6/2006 |

* cited by examiner

*Primary Examiner* — John J Lee
(74) *Attorney, Agent, or Firm* — Cozen O'Connor

(57) ABSTRACT

The invention relates to a method for the wireless communication between a base station and several devices. The base station monitors the non-use of the transmission of a device telegram to the base station in a time range, or in several consecutive time ranges, between two synchronization signals (S) in the communication mode and after a duration (Tping) of non-use emits an identification telegram (GW-ping).

11 Claims, 3 Drawing Sheets

ENERGY AND TIME-EFFICIENT SET-UP OF A WIRELESS COMMUNICATION SYSTEM

CROSS-REFERENCE TO RELATED APPLICATIONS

This is a U.S. national stage of International Application No. PCT/EP2008/002346, filed on 25 Mar. 2008. The entire content of the application is incorporated herein by reference.

BACKGROUND OF THE INVENTION

1. Field of the Invention

The invention relates to a method for wireless communication between a base station and a plurality of appliances which are configured or unconfigured for the communication channel, wherein the base station includes a normal mode of operation for communication with appliances which are found, in which synchronization signals are sent on a defined communication channel in a fixed time pattern, and two synchronization signals have at least one time range provided between them which has associated with it at least one of the appliances for transmitting an appliance telegram to the base station.

2. Description of the Related Art

Methods are known for wireless communication between a base station and a plurality of appliance in a manner that relates to the normal mode of operation, where the appliances that are registered in the network send their appliance telegrams to the base station. There are different methods for ensuring that this communication occurs without interference, i.e., only one appliance ever sends its appliance telegram. Firstly, this can be achieved by virtue of the base station reserving a defined time range, the length and position of which between the two synchronization signals are known, for an appliance to send its appliance telegram. This means that this appliance is associated with a time range. Secondly, a time range may have a plurality of associated appliances.

In this context, additional known methods ensure that the appliance telegrams for a plurality of appliances are in this case sent in succession to ensure interference-free transmission. Appliances which are not yet connected to the network or registered can receive and listen to the synchronization signals from the base station or the appliance telegrams from the already registered appliances if they are operated, at least at this moment, in the listening mode on the relevant communication channel. This reception provides the unregistered appliance with an indication of the available network.

Thus, if relatively few appliance telegrams are transmitted, i.e., the activation of the network is low, it may take a very long time before an unregistered appliance receives an appliance telegram. Sometimes, only synchronization signals are available for this purpose. In order to receive these, however, the communication channel must again also correspond and the appliance must currently be operated in the listening mode, which has an increased energy requirement.

SUMMARY OF THE INVENTION

It is therefore an object of the invention to provide an improved method by which unregistered appliances can identify the presence of the network as quickly as possible when there is low activity on the network.

This and other objects and advantages are achieved by a method for wireless communication between a base station and a plurality of appliances which are configured or unconfigured for the communication channel, where the base station includes a normal mode of operation for communication with appliances which are found. Here, synchronization signals are sent on a defined communication channel in a fixed time pattern, where two synchronization signals have at least one time range provided between them which is associated with at least one of the appliances for transmitting an appliance telegram to the base station.

In accordance with an embodiment of the invention, the base station monitors the nonuse of the appliance telegram transmitted to the base station in a time range or in a plurality of successive times ranges and sends an identification telegram (GWping) after a period (Tping) of nonuse.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the invention is explained in more detail below with reference to a drawings, in which.

DETAILED DESCRIPTION OF THE PREFERRED EMBODIMENTS

Figure 6:
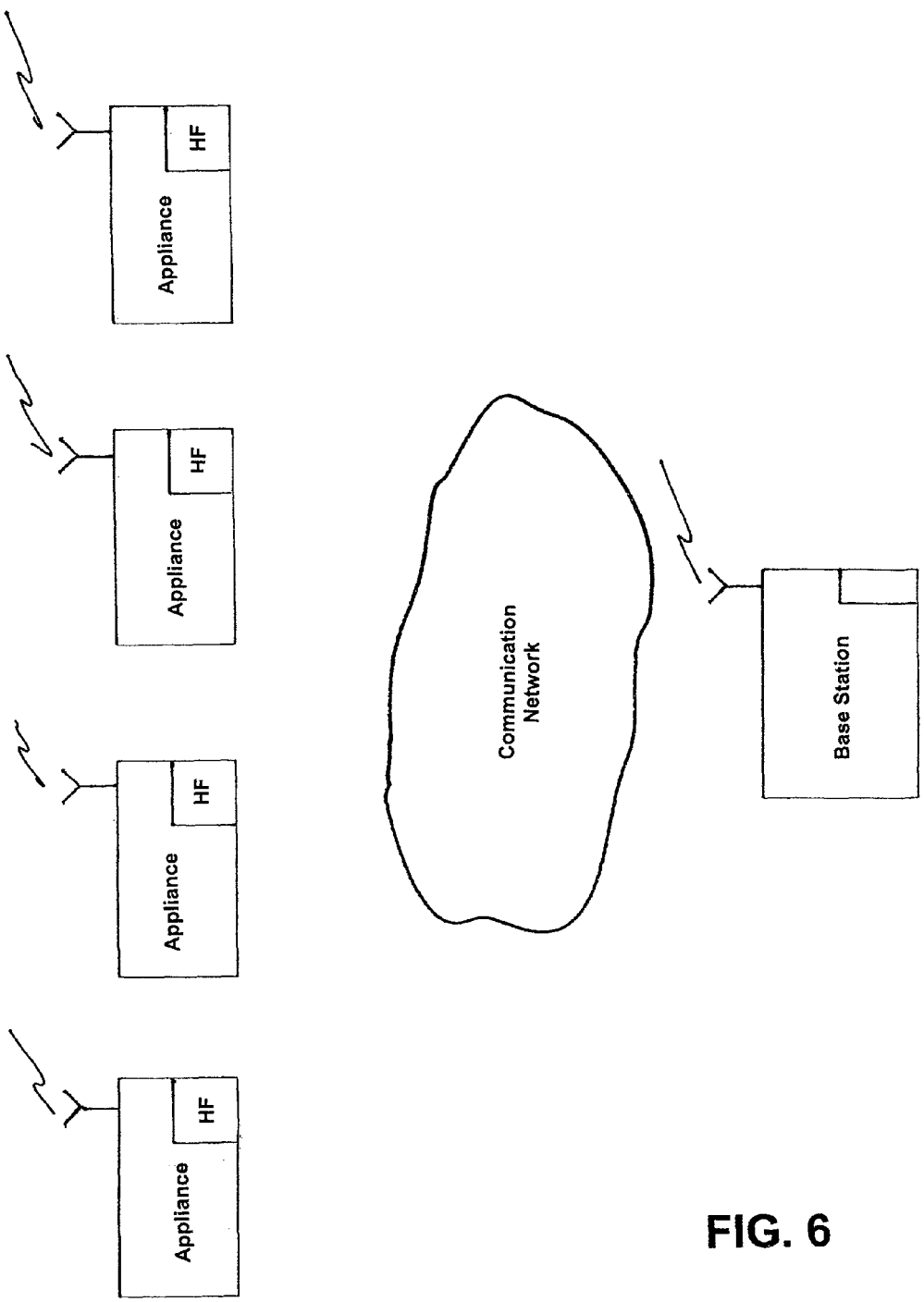
FIG. 6 is a schematic block diagram of a base station and appliance disposed in a communication network.

The method in accordance with the invention relates to a wireless communication network having a base station and a plurality of appliances which are configured or unconfigured for a communication channel of a communication network shown in FIG. 6.

Figure 1:
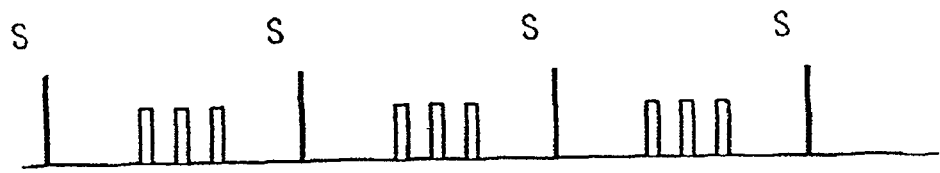
FIG. 1 is a graphical plot of the normal mode of operation of a conventional base station.

It is possible to distinguish between a plurality of operating states for a base station. In normal operation, communication with the found and selected appliances in the communication network occurs based on a stipulated protocol. This normal mode of operation is shown in FIG. 1. Here, the base station repeatedly sends a synchronization signal S on a defined communication channel. Between two synchronization signals S, communication time blocks are held or reserved for the communication between the base station and the connected appliances in a fixed time pattern. The communication time blocks, i.e., time ranges, have at least one associated appliance for communication with the base station.

In addition, the base station usually also has at least one search mode for setting up connections to the appliances. For example, a first search mode can be used to search for appliances on all or selected configured or unconfigured communication channels. In a second search mode, the search may be for appliances on a stipulated communication channel, for example.

For the communication mode, the base station stipulates which appliances are permitted to engage which of the time ranges of the communication channel, as per FIG. 1. To this end, the appliances are in time sync with the base station.

In principle, a distinction can be established between time ranges which each have only a single associated appliance and time ranges which have a plurality of associated appliances for sending an appliance telegram.

The latter subranges are correspondingly longer than the former.

Appliances which are registered and/or can communicate in the network are called registered appliances. They also include the base station.

In the case of the unregistered appliances, a distinction is established between configured and unconfigured appliances. In contrast to configured appliances, unconfigured appliances change communication channel autonomously if they have not been able to find a network in the currently selected communication channel.

In time ranges which have a plurality of associated appliances, a checking method prevents simultaneous channel use to thereby avoid collisions. However, this can result in relatively long waiting times before interference-free transmission of the appliance telegram is possible.

Such waiting times do not arise for time ranges with only one associated appliance in each case, but allows an increased data throughput in the communication channel.

Appliances which are not yet connected to the network or not registered can receive and listen to the synchronization signals S from the base station or the appliance telegrams from the already registered appliances if they are operated, at least at this moment, in the listening mode on the relevant communication channel. This reception provides the unregistered appliance with an indication of the available network.

Thus, if relatively few appliance telegrams are transmitted, i.e., if the activation of the network is low, it may be a very long time before an unregistered appliance receives an appliance telegram. Sometimes, only the synchronization signals S from the base station are available for identifying the network. To receive these, however, the communication channel must correspond and the appliance must be currently operated in the listening mode.

In accordance with the invention, the communication setup by unregistered appliances in the network is improved by virtue of the time ranges, which are not used for transmitting appliance telegrams or which are seldomly used, are also used for transmitting telegrams. The base station accordingly monitors the transmission of appliance telegrams.

In a time range with just one associated appliance, the appliance must start sending its appliance telegram no later than after a period Tping to ensure that the communication channel is engaged only in the associated time range. The residual period still remaining thereafter in the time range can, in the absence of the appliance telegram, be used by the base station to send an identification telegram GWping of corresponding length. This can be used even in the space of very short time ranges or very short appliance telegrams, because an appliance telegram sent by the appliance usually contains useful data, whereas the identification telegram GWping does not need to contain useful data. It is therefore possible to send an identification telegram GWping in each time range with just one associated appliance. Here, the base station thus uses only the portion of the time range which the appliance could no longer have used for sending its appliance telegram. Particularly in the case of short time ranges, this procedure is not advantageous and necessary in each of these time ranges in the absence of an appliance telegram.

Figure 2:
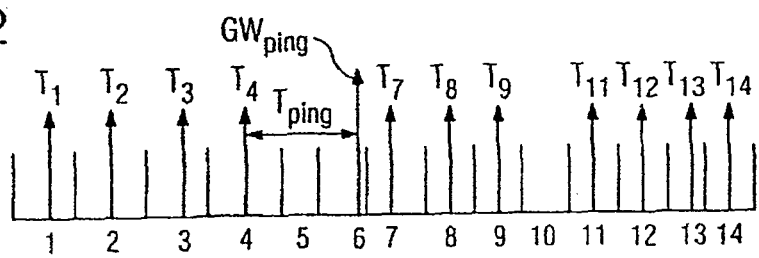
FIG. 2 is a graphical plot of a plurality of successive time ranges with a respective associated appliance.

In this regard, FIG. 2 is an exemplary graphical plot of a plurality of time ranges 1 to 14, each which has only one associated appliance. In the time ranges 1 to 4, the base station receives the relevant appliance telegrams T1, T2, T3, T4. The base station realizes that an appliance telegram has not been sent in the time ranges T5 and T6 and itself sends an identification telegram GWping shortly before the end of the time range 6 after the period Tping, which in this case has been calculated from the end of appliance telegram T4, for example. In this context, the time range 5 is of comparatively short duration, which means that the identification telegram GWping is not sent until an appliance telegram is absent in the time range 6, in order to relieve the load on the base station.

Figure 3:
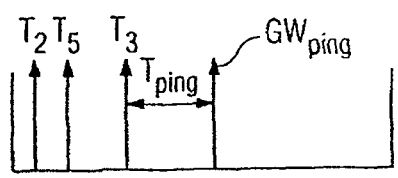
FIG. 3 is a graphical plot of an individual time range for the plurality of appliance telegrams.

FIG. 3 is a graphical plot of a single time range which has a plurality of associated appliances. After the base station has received the appliance telegrams T2, T5 and T3, the communication channel with its transmission frequency remains unused for the period Tping. During this period Tping, which is calculated from the end of the last appliance telegram T3, for example, none of the appliances registered for this time range has sent an appliance telegram. The base station then sends an identification telegram GWping, which is initially used to identify an existing network to allow the setup of communication with the registered appliance.

By way of example, the unregistered appliance may have a limited supply of energy. This unregistered appliance uses a high frequency (HF) radio which is switched on in its listening mode to receive the identification telegram GWping, where the listening mode is switched on for the listening period Trx, which is repeated at a repetition rate Fw. Outside of the listening period Trx, the unregistered appliance is switched to an energy saving mode, for example. This may likewise apply to further appliances which are already registered in the network.

The period Tping may be prescribed for various conditions and counted, i.e., logically derived, from the occurrence of different events.

The identification telegram GWping may contain a piece of information regarding the occurrence in time of the next synchronization telegram. The appliance can therefore switch to listen, as appropriate, in order to receive the next synchronization signal S.

Two communication states may arise for the appliances. A configured appliance is ready for communication on a stipulated channel. Although an unconfigured appliance has an arbitrary default channel, it can also change this on the basis of stipulatable criteria.

In principle, after being switched on, an appliance does not know what mode the base station is in and whether the base station is actually present. Accordingly, the appliance must always behave in the same way. An appliance which sends without synchronization may interfere with its own network or with extraneous networks. It is therefore advantageous if the appliances exhibit passive behavior for the setup of communication with the base station, i.e., for this purpose they only listen and do not themselves send. Appliances can listen to any kind of signals and telegrams on their communication channel during their listening phase. These include the synchronization signals S and also telegrams from the base station and appliance telegrams from other appliances. This reception indicates that a network is present.

Figure 4:
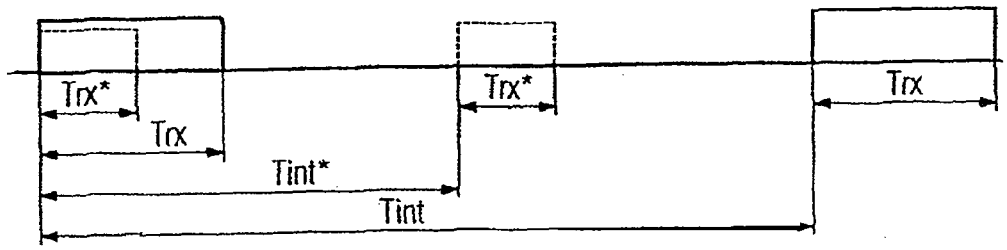
FIG. 4 is a graphical plot of a listening mode with a repeated listening period and a contrastingly modified listening mode with a shortened and accordingly more frequently occurring listening period.

By way of example, an appliance listens during an adjustable listening period Trx as shown in FIG. 4. The appliance can work on a configured or unconfigured communication channel. When the appliance receives a synchronization signal S from the base station on its communication channel, it can respond as appropriate. The connection to the base station has therefore been setup. In a rare case of an access conflict with another appliance, the process is repeated in the next listening phase. The time window with the listening period Trx can be repeated after a likewise adjustable repetition period Tint. If the respective appliance has only a limited supply of energy, it can be switched to an energy saving mode in the time periods outside of the listening period Trx. In the energy saving mode, loads such as the HF radio are disconnected.

The length of the listening period Trx, the repetition rate Fw (=1/Tint) and the energy consumption in the energy saving mode are advantageously coordinated with one another for the respective appliance such that its energy consumption does not exceed the energy consumption up to connection setup on average over time during normal operation, where the appliance can have a particular level of energy consumption in the normal mode of operation, such as due to communication with the base station.

For an admissible utilization level of the appliance of 0.1%, for example, and a listening period Trx of 60 ms, a repetition period Tint of 60 sec is obtained. This means that after approximately 60 sec all appliances on all communication channels have been captured.

If the listening period Trx is reduced to the listening period Trx* as shown in FIG. 4, such as halved, the repetition period Tint can accordingly be reduced to the repetition period Tint* given an unaltered utilization level. The shorter repetition period Tint* increases the probability of a fast connection setup.

The connection setup described applies to configured and unconfigured appliances in the same way, i.e., it can be achieved under the same time conditions.

Figure 5:
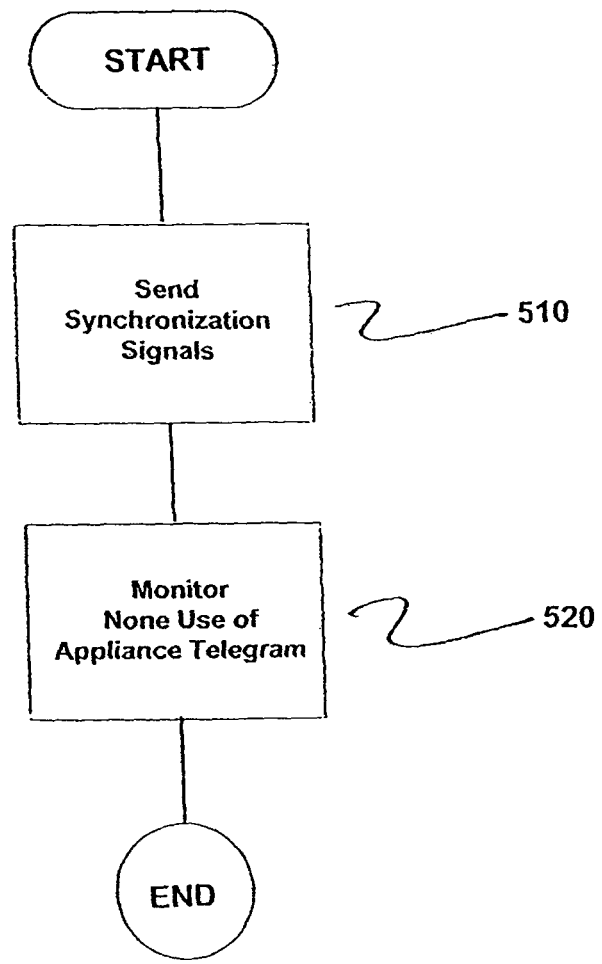
FIG. 5 is a flow chart of a method in accordance with an embodiment of the invention.

FIG. 5 is a flow chart of a method for wireless communication between a base station and a plurality of appliances that are either configured and unconfigured for the communication channel. The base station includes a normal mode of operation for communication with each of the plurality of appliances which are found. The method comprises sending a plurality of synchronization signals on a defined communication channel in a fixed time pattern, as indicated in step 510. Here, two of the plurality of synchronization signals have at least one time range provided therebetween, and at least one of the plurality of appliances for transmitting an appliance telegram to the base station is associated with the at least one time range Nonuse of an appliance telegram transmitted to the base station is then monitored at the base station within one of the at least one time range and a plurality of successive time ranges and an identification telegram is sent after a period of the nonuse of the transmitted appliance telegram, as indicated in step 520.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

The invention claimed is:

1. A method for wireless communication between a base station and a plurality of appliances, which are one of configured and unconfigured for the communication channel, the base station including a normal mode of operation for communication with each of said plural appliances which are found, the method comprising:
   sending a plurality of synchronization signals on a defined communication channel in a fixed time pattern, two of said plural synchronization signals having at least one time range provided therebetween, at least one of said plural appliances for transmitting an appliance telegram to the base station being associated with the at least one time range; and
   monitoring, at the base station, nonuse of an appliance telegram transmitted to the base station within one of the at least one time range and a plurality of successive time ranges and sending an identification telegram after a period of the nonuse of the transmitted appliance telegram;
   wherein a respective time range has only one associated appliance, and wherein following nonuse of the time range within a time period of length, such that a remaining period of the time range is insufficient for the transmission of the appliance telegram, the base station is able to send the identification telegram during the remaining period of the time range.

2. The method as claimed in claim 1, wherein the period of nonuse is a predetermined time period.

3. The method as claimed in claim 1, wherein each respective appliance of said plural appliances listens on one of a configured and unconfigured communication channel within a listening period, which is adjustable for the respective appliance, at a repetition rate which is adjustable for the respective appliance; the respective appliance is switched to an energy saving mode in at least some time periods outside of the listening period; and a length of the listening period, the repetition rate and an energy consumption in the energy saving mode are coordinated with each other for the respective appliance such that the energy consumption up until connection setup does not exceed the energy consumption in normal operation over an averaged period of time, the respective appliance having a particular energy consumption in the normal mode of operation.

4. The method as claimed in claim 3, wherein the energy saving mode is switched on for an entire period outside of the listening period.

5. The method as claimed in claim 1, wherein each of the plural appliances have a limited supply of energy.

6. The method as claimed in claim 1, wherein each of the plural successive time ranges have only one associated appliance, and wherein following nonuse of the plural successive time ranges for the transmission of the appliance telegram, the base station is able to send the identification telegram.

7. The method as claimed in claim 1, wherein the at least one time range includes a plurality of associated appliances, and wherein following a period of nonuse for the transmission of the appliance telegram, the base station is able to send the identification telegram.

8. The method as claimed in claim 1, wherein the identification telegram is used to setup communication with an unregistered appliance.

9. The method as claimed in claim 8, wherein the unregistered appliance uses a high frequency radio switched on during a listening mode to receive the identification telegram, wherein the listening mode is switched on for a listening period and is repeated at a repetition rate, and wherein the unregistered appliance is switched to an energy saving mode outside of the listening period.

10. The method as claimed in claim 1, wherein the identification telegram contains an information item relating to an occurrence over time of a next synchronization telegram.

11. The method as claimed in claim 10, wherein the normal mode of operation occurs due to communication with the base station.

* * * * *